Patented Jan. 30, 1940

2,188,795

UNITED STATES PATENT OFFICE 2,188,795

CANDLE AND FUEL COMPOSITION FOR CANDLES

Karl Rau, Medina, Ohio, assignor to The A. I. Root Company, Medina, Ohio, a corporation of Ohio No Drawing. Application March 11, 1938, Serial No. 195,344

4 Claims. (Cl. 44—7.5)

This invention relates to a candle and a fuel composition for candles.

An object is to provide a candle which can be made at less cost than pure beeswax candles, and have substantially the operating advantages of the latter, particularly superior physical strength at critical temperatures, clearness of flame, and greater length of burning period as compared to ordinary candles.

A further object is to provide a candle made partly from beeswax and partly from far less expensive material, in which the characteristic aroma of the beeswax remains clearly perceptible in the finished candle.

A further object is to provide a composition candle which can use advantageously the same type and size of wick as can pure beeswax candles of predetermined dimensions.

Still another object is to provide a fuel composition for candles including beeswax and a diluent for it which will not have any chemical action on the beeswax but which can nevertheless be intimately and uniformly mixed with it in any desired proportions.

Further objects of the invention will become apparent from the following detailed description. The essential characteristics are summarized in the claims.

The ingredient which I have discovered to be of marked advantage in the manufacture of candles is amorphous wax made from petroleum. The crude wax is dark brown in color. It has a melting point slightly higher than that of beeswax, and its tackiness, ductility and hardness correspond closely to said qualities of beeswax which has been run through a sheeter. The mineral wax is slightly softer. I do not know its chemical composition. It can be processed so that its color is about like average domestic crude beeswax, that is, a yellowish brown; and has been further decolorized.

Crude amorphous petroleum wax, can be obtained as a by-product from crude petroleum residuum after all the higher distillates have been removed. In one process, the residuum is mixed with naphtha and subjected to mechanical separative treatment cold—e. g. settling or filtering through fine cloth, or centrifuged—producing (a) crude petrolatum and naphtha and (b) what is known as "dilute bright stock." To the crude petrolatum and naphtha is added more naphtha and the result again subjected—cold—to mechanical separative treatment such as mentioned above. One of the two resulting products is the amorphous petroleum wax diluted with naphtha, which latter ingredient can simply be dried out to get amorphous wax of the desired hardness for use in candles as herein proposed and further refined or decolorized for the purpose as desired. Gulf Oil Company sells the material under the name "Petrowax." Another name by which it can be identified on the market is "Superla wax", a trade name under which it is sold by Standard Oil Company of Indiana.

While I do not desire to be limited except as specified in the claims to any particular proportions of materials, the following are given as satisfactory compositions for use in sacramental candles:

Example 1

52% beeswax of about 145° F. melting point.

40% Petrowax, having a melting point of about 154° F.

8% of Bodie Hoover Company #126 wax as a hardening agent. The latter is a crystalline mineral wax having a melting point of about 190° F.

Example 2

Satisfactory results can also be obtained by using from 25% to as high as 50% of amorphous mineral wax, and the remainder entirely beeswax of the melting point above given or thereabout.

Specific advantages obtained by the use of amorphous mineral wax in candles according to the above examples are: greater resistance to bending in a warm room, better resistance to breakage in shipment, a greater degree of uniformity of product, retention of the aroma of the beeswax, and increased burning time for reasons explained below.

Candles made according to Example 1 in one standard size e. g. 13 inches by ⅞ inch (commonly referred to as a No. 4 candle), will burn with an intense and comparatively smokeless flames for about fourteen hours. A candle of the same dimensions made of 100% beeswax, will burn with substantially equivalent intensity and smokelessness approximately fifteen hours. On the other hand, candles made from substantially 52% beeswax and 48% stearic acid and paraffin and provided with a wick such that the flame is comparable in intensity and freedom from smoke to either of the above (100% beeswax or the 52–40–8% composition) will burn only about eleven hours. When the diluent is principally paraffin the burning period is still shorter. The longer burning life of the 100% beeswax and 52–40–8% composition is largely a matter of the kind of wick that can be used successfully with a pure beeswax candle or the new composition hereof, namely, a square braid as against a flat braid. The former cannot be used as successfully with the beeswax-stearic acid composition given or a beeswax-paraffin composition or paraffin or stearic acid alone or combined with each other. The reason is that the materials mentioned, other than the amorphous wax and beeswax, have a marked tendency to overfeed the wick, wherefore wicks for such other materials are made with greater exterior surface in proportion to cross-section, in other words with less body in proportion to exposed surface.

Referring further to the feature, namely: that the characteristic aroma of the beeswax is clearly apparent in the finished candles, this I believe is due to the absence of chemical action of the amorphous wax on the beeswax. Stearic acid has a marked chemical action on beeswax, and when used as the sole or partial diluent for beeswax in making for example, "51% beeswax" candles, said characteristic aroma of the beeswax almost if not wholly disappears. Paraffin does not have such chemical action on beeswax but it has other disadvantages, fully as serious, part of which are discussed above in respect to burning time. Moreover, it tends to separate from a molten mixture with beeswax, gives the candles an undesired greasy feeling to the touch, and lowers the strength at critical temperatures.

Candles made largely from amorphous petroleum wax cannot, of course, be molded as easily as can paraffin or stearic acid candles, because the amorphous wax tends to adhere to the molds. Accordingly, the preferred ways of making the candles are by dipping, pouring or as covered by United States Patent 1,863,416, June 14, 1932, owned by the assignee hereof, namely, by rolling from sheets of fuel material. The candles are particularly well adapted to be made by the method just mentioned because the amorphous petroleum wax can be formed into strong pliable sheets just as can beeswax (e. g. expressed from a die under pressure).

I am aware of the fact that use has been made of ceresin (refined ozokerite) and montan wax in making candles prior to the present invention. These materials are of bituminous nature, and if either is used alone or in substantial proportions with other materials in the making of candles, the latter have a marked tendency to smoke.

I claim:

1. A devotional candle, the fuel composition of which contains over 50% of beeswax and at least 25% of amorphous mineral wax derived from crude petroleum oil, said ingredients being thoroughly blended.

2. A devotional candle, the fuel body of which is a blend comprising about one-half beeswax and the remainder of which is a diluent the major proportion of which is a mineral wax derived from petroleum, which mineral wax is substantially wholly of non-crystalline form and has a melting point not less than that of beeswax, the diluent being further characterized in that when melted and blended homogeneously with the beeswax it will not react chemically therewith or obscure substantially the characteristic aroma of the beeswax in the finished candle.

3. A devotional light, the fuel composition of which contains over 25% but less than 50% of amorphous mineral wax derived from petroleum, the remainder consisting of other fuel material, principally beeswax, homogeneously mixed therewith.

4. A devotional candle having a solid fuel body comprising about 52% beeswax, about 40% of non-crystalline mineral wax derived from petroleum and having a higher melting point than the beeswax, and about 8% of a wax having a melting point considerably higher than either aforesaid wax.

KARL RAU.